(12) United States Patent
Meysami et al.

(10) Patent No.: US 12,545,772 B2
(45) Date of Patent: Feb. 10, 2026

(54) METHOD FOR PRODUCING AN INTRINSICALLY FOAMED POLYAMIDE AND A SHAPED ARTICLE THEREFROM

(71) Applicant: BASF SE, Ludwigshafen am Rhein (DE)

(72) Inventors: Mohammad Meysami, Budd Lake, NJ (US); Gijsbrecht Jacobus Maria Habraken, Ludwigshafen (DE); Stephen J. Hanley, Budd Lake, NJ (US)

(73) Assignee: BASF SE, Ludwigshafen am Rhein (DE)

( * ) Notice: Subject to any disclaimer, the term of this patent is extended or adjusted under 35 U.S.C. 154(b) by 894 days.

(21) Appl. No.: 17/426,076

(22) PCT Filed: Jan. 20, 2020

(86) PCT No.: PCT/EP2020/051212
§ 371 (c)(1),
(2) Date: Jul. 27, 2021

(87) PCT Pub. No.: WO2020/156846
PCT Pub. Date: Aug. 6, 2020

(65) Prior Publication Data
US 2022/0098379 A1 Mar. 31, 2022

Related U.S. Application Data

(60) Provisional application No. 62/798,532, filed on Jan. 30, 2019.

(30) Foreign Application Priority Data

Apr. 16, 2019 (EP) .................... 19169423

(51) Int. Cl.
| | | |
|---|---|---|
| *C08J 9/06* | (2006.01) | |
| *B29C 48/00* | (2019.01) | |
| *C08J 9/00* | (2006.01) | |
| *C08K 7/14* | (2006.01) | |
| *B29K 77/00* | (2006.01) | |

(52) U.S. Cl.
CPC ......... *C08J 9/0061* (2013.01); *B29C 48/0012* (2019.02); *C08J 9/0085* (2013.01); *C08J 9/06* (2013.01); *C08K 7/14* (2013.01); *B29K 2077/00* (2013.01); *C08J 2201/03* (2013.01); *C08J 2205/044* (2013.01); *C08J 2377/02* (2013.01); *C08J 2435/06* (2013.01)

(58) Field of Classification Search
CPC ............. B29C 48/0012; B29K 2077/00; C08J 9/0061; C08J 9/0085; C08J 9/02; C08J 9/06; C08J 2201/03; C08J 2205/044; C08J 2377/02; C08J 2435/06; C08K 7/14; C08K 3/346; C08L 35/06; C08L 77/02
See application file for complete search history.

(56) References Cited

U.S. PATENT DOCUMENTS

| | | |
|---|---|---|
| 4,772,671 A | 9/1988 | Steeman et al. |
| 6,211,266 B1 | 4/2001 | Weber et al. |
| 7,671,127 B2 | 3/2010 | Weber et al. |
| 2011/0098372 A1 | 4/2011 | Aulenta et al. |
| 2012/0208922 A1* | 8/2012 | Matthijssen ............ C08L 27/20 524/508 |
| 2014/0323631 A1 | 10/2014 | Gabriel et al. |

FOREIGN PATENT DOCUMENTS

| | | |
|---|---|---|
| CN | 104788948 | 7/2015 |
| JP | S62-104819 A | 5/1987 |
| JP | 2011-074179 | 4/2011 |
| JP | 2011-526315 | 10/2011 |
| JP | 2013035908 A | 2/2013 |
| JP | 2016196563 A | 11/2016 |
| KR | 10-2011-0028533 | 3/2011 |
| WO | 2004083303 A1 | 9/2004 |
| WO | 2010000572 A1 | 1/2010 |

OTHER PUBLICATIONS

Brazilian Search Report and Written Opinion dated Aug. 23, 2023, in Brazilian Application No. 112021014981-3, 4 pages.
Chinese Office Action dated Oct. 24, 2022, in Chinese Patent Application No. 202080016569.0, with English translation, 17 pages.
Chinese Office Action dated Apr. 22, 2023, in Chinese Patent Application No. 202080016569.0, 6 pages.
European Communication pursuant to Article 94(3) EPC dated Jul. 21, 2023, in European Patent Application No. 20701314.5, 4 pages.
International Search Report for corresponding PCT/EP2020/051212 mailed Feb. 13, 2020, 10 Pages.
Chinese Rejection Decision dated Aug. 19, 2023, in Chinese Application No. 202080016569.0, 7 pages.
European Search Report for EP Patent Application No. 19169423.1, Issued on Sep. 19, 2019, 3 pages.
Office Action received for Canadian Patent Application No. 3,127,914, mailed on Dec. 6, 2024, 3 pages.
Office Action issued in Korean Patent Application No. 10-2021-7027557 on Feb. 12, 2025, 13 pages with English translation.

* cited by examiner

*Primary Examiner* — John M Cooney
(74) *Attorney, Agent, or Firm* — Baltazar Gomez

(57) ABSTRACT

Described herein is a method for producing an intrinsically foamed polyamide and a shaped article including the intrinsically foamed polyamide.

10 Claims, 1 Drawing Sheet

METHOD FOR PRODUCING AN INTRINSICALLY FOAMED POLYAMIDE AND A SHAPED ARTICLE THEREFROM

CROSS-REFERENCE TO RELATED APPLICATIONS

This application is a U.S. National Phase Application of International Patent Application No. PCT/EP2020/051212, filed Jan. 20, 2020, which claims priority to U.S. Provisional Patent Application No. 62/798,532, filed Jan. 30, 2019, and which claims priority to European Patent Application No. 19169423.1, filed Apr. 16, 2019, the entire contents of which are hereby incorporated by reference herein.

FIELD OF INVENTION

The presently claimed invention relates to a method for producing an intrinsically foamed polyamide and a shaped article comprising the intrinsically foamed polyamide.

BACKGROUND OF THE INVENTION

Density reduction in polymers is advantageous for various applications, such as but not limited to transportation and insulation applications.

Foaming is one such technique, wherein the density of the resulting polymer foam can be controlled. Typically, foaming involves the use of blowing agents, such as physical and chemical blowing agents. Physical blowing agents are inert volatile compounds such as but not limited to hydrofluorocarbons, hydrochlorofluorocarbons and hydrofluoroolefins. These are added to the polymer to foam in the melt and expand in consequence of the high temperature, thereby resulting in a polymer foam with a desired density.

Chemical blowing agents are compounds undergoing chemical reaction in the melt and in the process release a propellant which expands and causes the polymer melt to foam to the desired density. Despite the blowing agents being used extensively for producing foams, they are less effective when high levels of void fraction are desired.

Polymers, such as polyamides, are extensively used for various applications, including transportation and insulation. As one of the most important engineering plastics, polyamide is known for its high temperature performance, stiffness, chemical resistance, fatigue performance and other mechanical properties.

Melt foaming of polyamides, however, is very challenging and can be done in a very narrow processing window mainly due to its inherent low melt strength. This becomes even more challenging when a foam material with high expansion ratio and high void fraction is desirable. High melt strength is crucial to process highly expanded foams.

Polyamide foams have been described in US publication no. 2014/0323631 A1, U.S. Pat. Nos. 7,671,127 B2 and 6,211,266 B1. These documents describe the use of copolymers, in particular styrene maleic anhydride copolymer, as suitable chain extender in combination with polyamides and copolymers thereof.

Although, the existing polyamide foams describe the use of styrene maleic anhydride, there are several limitations to them. One such limitation is the appropriate reduction in foam density without affecting the mechanical properties. Additionally, the existing compositions do not provide for a processable melt strength in the compositions, which result in very low void fraction in the resulting foams, thereby rendering them inappropriate for application in automotive parts, insulation material, structural reinforcing components, furniture components, window thermal breaker strips, tubes, pipes, cable jackets, electronic and electrical parts.

It was, therefore, an object of the presently claimed invention to provide a method for producing an intrinsically foamed polyamide with acceptable density reduction and which is processable due to acceptable melt strength, has high void fraction without significant bubble collapsing and which renders it appropriate and advantageous for application in automotive parts, insulation material, structural reinforcing components, furniture components, window thermal breaker strips, tubes, pipes, cable jackets, electronic and electrical parts.

SUMMARY OF THE INVENTION

Surprisingly, it has been found that the above object is met by providing a method for producing an intrinsically foamed polyamide which comprises the steps of (A) melt compounding a compounding mixture comprising a polyamide having a viscosity number in between 90 ml/g to 350 ml/g determined according to ISO 307, a copolymer having a weight average molecular weight in between 5000 g/mol to 15000 g/mol and a reinforcing agent, and (B) extruding or molding the said compounding mixture to obtain the intrinsically foamed polyamide.

Accordingly, in one aspect, the presently claimed invention is directed to a method for producing an intrinsically foamed polyamide, said method comprising the steps of:

(A) melt compounding a compounding mixture comprising:
 (a) a polyamide having a viscosity number in between 90 ml/g to 350 ml/g determined according to ISO 307,
 (b) a copolymer having a weight average molecular weight in between 5000 g/mol to 15000 g/mol, said copolymer is obtained by reacting a mixture comprising (b1) maleic acid and/or maleic anhydride, and (b2) a vinyl monomer, and
 (c) a reinforcing agent, and
(B) extruding or molding the compounding mixture of step (A) to obtain the intrinsically foamed polyamide having a void fraction in between 1% to 60% determined from scanning electron microscopy and a foam density of less than 1500 kg/m$^3$ determined according to ISO 1183/A.

In another aspect, the presently claimed invention is directed to an intrinsically foamed polyamide obtained above.

In yet another aspect, the presently claimed invention is directed to a shaped article comprising the above intrinsically foamed polyamide.

BRIEF DESCRIPTION OF THE FIGURES

FIG. 1 illustrates a scanning electron microscope image of the intrinsically foamed polyamide.

DETAILED DESCRIPTION OF THE INVENTION

Before the present compositions and formulations of the invention are described, it is to be understood that this invention is not limited to particular compositions and formulations described, since such compositions and formulations may, of course, vary. It is also to be understood that the terminology used herein is not intended to be limiting, since the scope of the presently claimed invention will be limited only by the appended claims.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Furthermore, the terms "first", "second", "third" or "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms "first", "second", "third" or"(A)", "(B)" and "(C)" or "(a)", "(b)", "(c)", "(d)", "i", "ii" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the presently claimed invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

Furthermore, the ranges defined throughout the specification include the end values as well, i.e. a range of 1 to 10 implies that both 1 and 10 are included in the range. For the avoidance of doubt, the applicant shall be entitled to any equivalents according to applicable law.

An aspect of the presently claimed invention describes a method for producing an intrinsically foamed polyamide, said method comprising the steps of:
(A) melt compounding a compounding mixture comprising:
(a) a polyamide having a viscosity number in between 90 ml/g to 350 ml/g determined according to ISO 307,
(b) a copolymer having a weight average molecular weight in between 5000 g/mol to 15000 g/mol, said copolymer is obtained by reacting a mixture comprising (b1) maleic acid and/or maleic anhydride, and (b2) a vinyl monomer, and
(c) a reinforcing agent, and
(B) extruding or molding the compounding mixture of step (A) to obtain the intrinsically foamed polyamide having a void fraction in between 1% to 60% determined from scanning electron microscopy (SEM) and a foam density of less than 1500 kg/m$^3$ determined according to ISO 1183/A.

In one embodiment, the melt compounding in step (A) includes mixing and/or blending the compounding mixture as described herein. Suitable mixing means and blending means are well known to the person skilled in the art. Additionally, each ingredient in the compounding mixture can be added in any manner and sequence known to the person skilled in the art.

Although, suitable conditions for melt compounding are well known to the person skilled in the art, in an embodiment, a temperature in between 220° C. to 300° C. is maintained in step (A). In another embodiment, the temperature is in between 230° C. to 280° C., or 240° C. to 260° C.

In one embodiment, the viscosity number of the polyamide, as described herein, is in between 90 ml/g to 340 ml/g, or 100 ml/g to 340 ml/g, or 100 ml/g to 330 ml/g, 100 ml/g to 320 ml/g, or 100 ml/g to 310 ml/g, or 100 ml/g to 300 ml/g. In other embodiment, it is in between 110 ml/g to 300 ml/g, or 110 ml/g to 290 ml/g, or 110 ml/g to 280 ml/g, or 110 ml/g to 280 ml/g, or 110 ml/g to 270 ml/g, or 120 ml/g to 270 ml/g, or 120 ml/g to 260 ml/g, or 120 ml/g to 250 ml/g, or 120 ml/g to 240 ml/g, or 120 ml/g to 230 ml/g, 120 ml/g to 220 ml/g. In yet another embodiment, it is in between 130 ml/g to 220 ml/g, 130 ml/g to 210 ml/g, or 130 ml/g to 200 ml/g, 130 ml/g to 190 ml/g, or 140 ml/g to 190 ml/g, or 140 ml/g to 180 ml/g, or 140 ml/g to 170 ml/g, or 140 ml/g to 160 ml/g.

In another embodiment, suitable polyamides are, for example, derived from lactams having 7 to 13 ring members or obtained by reaction of dicarboxylic acids with diamines. Examples of polyamides which are derived from lactams include polycaprolactam, polycaprylolactam and/or polylaurolactam.

In other embodiment, suitable polyamides further include those obtainable from w-aminoalkyl nitriles, such as but not limited to, aminocapronitrile, which leads to nylon-6. In addition, dinitriles can be reacted with diamine. For example, adiponitrile can be reacted with hexamethylenediamine to obtain nylon-6,6. The polymerization of nitriles is effected in the presence of water and is also known as direct polymerization.

When polyamides obtainable from dicarboxylic acids and diamines are used, dicarboxylalkanes (aliphatic dicarboxylic acids) having 6 to 36 carbon atoms, or 6 to 12 carbon atoms, or 6 to 10 carbon atoms can be employed. Aromatic dicarboxylic acids are also suitable. Examples of dicarboxylic acids include adipic acid, azelaic acid, sebacic acid, dodecanedioic acid and also terephthalic acid and/or isophthalic acid.

Suitable diamines include, for example, alkanediamines having 4 to 36 carbon atoms, or 6 to 12 carbon atoms, in particular having 6 to 8 carbon atoms, and aromatic diamines, for example m-xylylenediamine, di(4-aminophenyl)methane, di(4-aminocyclohexyl)methane, 2,2-di(4-aminophenyl)propane, 2,2-di(4-aminocyclohexyl)propane and 1,5-diamino-2-methylpentane.

In other embodiment, polyamides include polyhexamethylenedipamide, polyhexamethylenesebacamide and polycaprolactam and also nylon-6/6,6, in particular having a proportion of caprolactam units in between 5 wt.-% to 95 wt.-%.

In another embodiment, suitable polyamides include aliphatic, semiaromatic or aromatic polyamides. The term "aliphatic polyamides" is understood to mean that the polyamides are formed exclusively from aliphatic monomers. Similarly, the term "semiaromatic polyamides" is understood to mean that the polyamides are formed from both aliphatic and aromatic monomers. Similarly, the term "aromatic polyamides" is understood to mean that the polyamides are formed exclusively from aromatic monomers.

The non-exhaustive list which follows comprises the aforementioned polyamides that are suitable for use in the compounding mixture of step (A).

AB Polymers:

| PA 4 | Pyrrolidone |
| PA 6 | ε-caprolactam |
| PA 7 | Enantholactam |
| PA 8 | Caprylolactam |
| PA 9 | 9-aminopelargonic acid |
| PA 11 | 11-aminoundecanoic acid |
| PA 12 | Laurolactam |

AA/BB Polymers:

| PA 46 | Tetramethylenediamine, adipic acid |
| PA 66 | Hexamethylenediamine, adipic acid |
| PA 69 | Hexamethylenediamine, azelaic acid |
| PA 610 | Hexamethylenediamine, sebacic acid |
| PA 612 | Hexamethylenediamine, decanedicarboxylic acid |
| PA 613 | Hexamethylenediamine, undecanedicarboxylic acid |
| PA 1212 | Dodecane-1,12-diamine, decanedicarboxylic acid |
| PA 1313 | Tridecane-1,13-diamine, undecanedicarboxylic acid |
| PA 6T | Hexamethylenediamine, terephthalic acid |
| PA 9T | Nonyldiamine, terephthalic acid |
| PA MXD6 | m-xylylenediamine, adipic acid |
| PA 6I | Hexamethylenediamine, isophthalic acid |
| PA 6-3-T | Trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | Diaminocyclohexylmethane, laurolactam |
| PA 6I/6T/PACM | As PA 6I/6T and diaminodicyclohexylmethane |
| PA 12/MACMI | Laurolactam, dimethyldiaminodicyclohexylmethane, isophthalic acid |
| PA 12/MACMT | Laurolactam, dimethyldiaminodicyclohexylmethane, terephthalic acid |
| PA PDA-T | Phenyldiamine, terephthalic acid |

In one embodiment, the polyamide comprises of aliphatic polyamide. In other embodiment, suitable polyamide is selected from polyamide 6 (PA 6), polyamide 66 (PA 66), or a blend or a copolymer thereof, as described herein.

Accordingly, in another embodiment, the compounding mixture in the step (A) comprises:
  (a) polyamide selected from PA 6, PA 66, or blend or copolymer thereof,
  (b) copolymer having a weight average molecular weight in between 5000 g/mol to 15000 g/mol, said copolymer is obtained by reacting the mixture comprising (b1) maleic acid and/or maleic anhydride, and (b2) the vinyl monomer, and
  (c) reinforcing agent.

In yet another embodiment, the compounding mixture in the step (A) comprises:
  (a) polyamide comprising PA 6,
  (b) copolymer having a weight average molecular weight in between 5000 g/mol to 15000 g/mol, said copolymer is obtained by reacting the mixture comprising (b1) maleic acid and/or maleic anhydride, and (b2) the vinyl monomer, and
  (c) reinforcing agent.

Suitable amount of the polyamide, as described herein, is in between 10 wt.-% to 95 wt.-% based on the total weight of the compounding mixture. In one embodiment, the amount of the polyamide is in between 15 wt.-% to 95 wt.-%, or 15 wt.-% to 90 wt.-%. In another embodiment, the amount is in between 20 wt.-% to 90 wt.-%, or 20 wt.-% to 85 wt.-%. In yet other embodiment, it is in between 25 wt.-% to 85 wt.-%, or 25 wt.-% to 80 wt.-%. In still other embodiment, it is in between 25 wt.-% to 75 wt.-%, or 25 wt.-% to 70 wt.-%, or 35 wt.-% to 60 wt.-%.

In an embodiment, the copolymer in the compounding mixture has the weight average molecular weight (Mw) in between 6000 g/mol to 15000 g/mol, or 6000 g/mol to 14000 g/mol. In another embodiment, it is in between 6000 g/mol to 13000 g/mol, or 6000 g/mol to 12000 g/mol, or 6000 g/mol to 11000 g/mol. In yet other embodiment, it is in between 7000 g/mol to 11000 g/mol, or 8000 g/mol to 11000 g/mol, or 8000 g/mol to 10000 g/mol, or 9000 g/mol to 10000 g/mol. Suitable methods for determining Mw are known to the person skilled in the art. For instance, gel permeation chromatography (GPC) can be used in the present context.

The copolymer is obtained by reacting the mixture comprising (b1) maleic acid and/or maleic anhydride, and (b2) vinyl monomer. Suitable process for copolymerization reaction between (b1) and (b2) is well known to the person skilled in the art. For instance, reference can be made to Chapters 9 and 10 of Maleic Anhydride by B. V. Trivedi and B. M. Culbertson, Plenum Press 1982, 1$^{st}$ edition.

In one embodiment, suitable vinyl monomers are selected from vinyl aromatic monomers, vinyl aliphatic monomers, acrylates or mixtures of these. In other embodiment, the vinyl monomers include styrene, α-methylstyrene, para-methylstyrene or mixtures of these. The vinyl-aliphatic monomers include ethylene, propylene or mixtures thereof. The acrylates include acrylates, methacrylates or mixtures thereof. In other embodiment, the vinyl monomer is styrene.

Particularly, the copolymer comprising styrene maleic anhydride (SMA) is advantageous for the present invention as it functions as a chain extender as well as a blowing agent. SMA being thermally stable and non-volatile, generates $CO_2$, when subjected to fabrication techniques in the step (B), via a decarboxylation reaction. Also, it improves the melt viscosity and strength that is required to form a stable cellular structure in the intrinsically foamed polyamide. Thus, minimum or no bubble collapse is observed in the cellular structure.

In another embodiment, the copolymer, as described herein, is obtained by reacting the mixture comprising (b1) maleic anhydride and (b2) styrene. Accordingly, the compounding mixture in the step (A) comprises:
  (a) polyamide selected from PA 6, PA 66, or blend or copolymer thereof,
  (b) copolymer having the weight average molecular weight in between 5000 g/mol to 15000 g/mol, said copolymer obtained by reacting the mixture comprising (b1) maleic anhydride, and (b2) styrene, and
  (c) reinforcing agent.

In another embodiment, the compounding mixture in the step (A) comprises:
  (a) polyamide comprising PA 6, (b) copolymer having the weight average molecular weight in between 7000 g/mol to 11000 g/mol, said copolymer obtained by reacting the mixture comprising (b1) maleic anhydride, and (b2) styrene, and (c) reinforcing agent.

In another embodiment, the copolymer, as described herein, is obtained by reacting the mixture comprising (b1) and (b2) in a molar ratio in between 1:1 to 5:1. In one embodiment, the molar ratio is in between 1.5:1 to 5:1, or 1.5:1 to 4.5:1, or 1.5:1 to 4:1. In other embodiment, the molar ratio is in between 2:1 to 4:1, or 2.5:1 to 4:1. In yet other embodiment, the molar ratio is in between 2.5:1 to 3.5:1.

Accordingly, in an embodiment, the compounding mixture in the step (A) comprises:

(a) polyamide having the viscosity number in between 90 ml/g to 350 ml/g determined according to ISO 307, (b) copolymer having the weight average molecular weight in between 5000 g/mol to 15000 g/mol, said copolymer obtained by reacting the mixture comprising (b1) maleic acid and/or maleic anhydride, and (b2) vinyl monomer, and (c) reinforcing agent, wherein the molar ratio between (b1) and (b2) is in between 1:1 to 5:1.

In another embodiment, the compounding mixture in the step (A) comprises:

(a) polyamide selected from PA 6, PA 66, or blend or copolymer thereof, (b) copolymer having the weight average molecular weight in between 7000 g/mol to 11000 g/mol, said copolymer obtained by reacting the mixture comprising (b1) maleic acid and/or maleic anhydride, and (b2) vinyl monomer, and (c) reinforcing agent, wherein the molar ratio between (b1) and (b2) is in between 1:1 to 5:1.

In another embodiment, the compounding mixture in the step (A) comprises:

(a) polyamide comprising PA 6, (b) copolymer having the weight average molecular weight in between 7000 g/mol to 11000 g/mol, said copolymer obtained by reacting the mixture comprising (b1) maleic anhydride, and (b2) styrene, and (c) reinforcing agent, wherein the molar ratio between (b1) and (b2) is in between 1:1 to 5:1.

Suitable amount of the copolymer in the compounding mixture in the step (A), as described herein, is in between 0.05 wt.-% to 10.0 wt-% based on the total weight of the compounding mixture. In one embodiment, the amount of the polyamide is in between 0.05 wt-% to 9.0 wt.-%, or 0.1 wt.-% to 9.0 wt.-%, or 0.1 wt.-% to 8.0 wt.-%, or 0.2 wt.-% to 8.0 wt.-%, or 0.2 wt.-% to 7.0 wt.-%, or 0.3 wt.-% to 7.0 wt.-%, or 0.3 wt.-% to 6.0 wt.-%. In another embodiment, the amount is in between. In yet other embodiment, it is in between 0.4 wt-% to 6.0 wt-%, or 0.4 wt-% to 5.0 wt-%, or 0.5 wt-% to 5.0 wt-%, or 0.5 wt.-% to 4.0 wt.-%, 0.6 wt.-% to 4.0 wt.-%. In still another embodiment, it is in between 0.7 wt.-% to 4.0 wt.-%, or 0.8 wt.-% to 4.0 wt.-%, or 0.9 wt.-% to 4.0 wt.-%.

In another embodiment, suitable reinforcing agents include woven as well as non-woven fibers. Such reinforcing agents are selected from metal fiber, metalized synthetic fiber, glass fiber, carbon fiber, ceramic fiber, mineral fiber, basalt fiber, inorganic fiber, kenaf fiber, jute fiber, flax fiber, hemp fiber, cellulosic fiber, sisal fiber and coir fiber.

In one embodiment, the reinforcing agent is selected from metal fiber, metalized synthetic fiber, glass fiber, carbon fiber, ceramic fiber, mineral fiber, basalt fiber, inorganic fiber, kenaf fiber, jute fiber, flax fiber and hemp fiber. In other embodiment, it is selected from metal fiber, metalized synthetic fiber, glass fiber, carbon fiber, ceramic fiber and mineral fiber. In yet another embodiment, it is selected from metal fiber, metalized synthetic fiber and glass fiber. In still another embodiment, reinforcing agent is glass fiber.

Accordingly, in an embodiment, the compounding mixture in the step (A) comprises:

(a) polyamide having the viscosity number in between 90 ml/g to 350 ml/g determined according to ISO 307, (b) copolymer having the weight average molecular weight in between 5000 g/mol to 15000 g/mol, said copolymer obtained by reacting the mixture comprising (b1) maleic acid and/or maleic anhydride, and (b2) vinyl monomer, and (c) glass fiber.

In another embodiment, the reinforcing agent, as described herein, is subjected to a surface treatment agent. The surface treatment agent is also known as sizing. The reinforcing agent, when subjected to surface treatment agent, further improve the mechanical properties.

In one embodiment, the surface treatment agent is a coupling agent comprising one or more of a silane coupling agent, titanium coupling agent, aluminate coupling agent, urethane coupling agent and epoxy coupling agent. In other embodiment, the coupling agent comprises urethane coupling agent or epoxy coupling agent. Suitable techniques for surface treatment are well known to the person skilled in the art. For instance, any suitable coating process, such as but not limited to, dip coating and spray coating can be employed.

In an embodiment, the urethane coupling agent comprises at least one urethane group. Suitable urethane coupling agents for use with polyamides are known to the person skilled in the art, as for instance described in US pub. no. 2018/0282496 incorporated herein by reference. In one embodiment, the urethane coupling agent comprises, for example, a reaction product of an isocyanate, such as but not limited to, m-xylylene diisocyanate (XDI), 4,4'-methylenebis(cyclohexyl isocyanate) (HMDI) or isophorone diisocyanate (IPDI), and a polyester based polyol or a polyether based polyol.

In another embodiment, the epoxy coupling agent comprises at least one epoxy group. suitable epoxy coupling agents for use with polyamides are known to the person skilled in the art, as for instance described in US pub. no. 2015/0247025 incorporated herein by reference. In one embodiment, the epoxy coupling agent is selected from aliphatic epoxy coupling agent, aromatic epoxy coupling agent or mixture thereof. Non-limiting example of aliphatic coupling agent includes a polyether polyepoxy compound having two or more epoxy groups in a molecule and/or polyol polyepoxy compound having two or more epoxy groups in a molecule. As aromatic coupling agent, a bisphenol A epoxy compound or a bisphenol F epoxy compound can be used.

Suitable amounts of the surface treatment agents, as described herein, are well known to the person skilled in the art. Further, the amount of these surface treatment agents vary depending on the application of the reinforcing agent, as described herein. However, in one embodiment, the surface treatment agent can be present in an amount of 0.1 parts by mass to 10.0 parts by mass relative to 100 parts by mass of the reinforcing agent.

For the purpose of the present invention, the reinforcing agent can be obtained in any shape and size. For instance, the reinforcing agent can be, such as but not limited to, a strand having a lateral and through-plane dimension or a spherical particle having diameter. The present invention is not limited by the shape and size of the reinforcing agent. For instance, the reinforcing agent can have an average dimension in between 1 μm to 20 μm determined according to ASTM D578-98.

Further, suitable amount of the reinforcing agent, as described herein, is in between 5 wt.-% to 70 wt.-% based on the total weight of the compounding mixture. In one embodiment, it is in between 10 wt.-% to 70 wt.-%, or 10 wt.-% to 65 wt.-%, or 15 wt.-% to 65 wt.-%. In another embodiment, it is in between 15 wt.-% to 60 wt.-%, or 20 wt.-% to 60 wt.-%, or 20 wt.-% to 60 wt.-%. In yet other embodiment, it is in between 25 wt.-% to 60 wt.-%, or 30 wt.-% to 60 wt.-%.

The compounding mixture in the step (A) further comprises an impact modifier and/or a nucleating agent. Accordingly, in one embodiment, the compounding mixture in the step (A) comprises:
- (a) polyamide having the viscosity number in between 90 ml/g to 350 ml/g determined according to ISO 307,
- (b) copolymer having the weight average molecular weight in between 5000 g/mol to 15000 g/mol, said copolymer obtained by reacting the mixture comprising (b1) maleic acid and/or maleic anhydride, and (b2) vinyl monomer,
- (c) reinforcing agent, and
- (d) impact modifier.

In other embodiment, the compounding mixture in the step (A) comprises:
- (a) polyamide having the viscosity number in between 90 ml/g to 350 ml/g determined according to ISO 307,
- (b) copolymer having the weight average molecular weight in between 5000 g/mol to 15000 g/mol, said copolymer obtained by reacting the mixture comprising (b1) maleic acid and/or maleic anhydride, and (b2) vinyl monomer,
- (c) reinforcing agent, and
- (d) nucleating agent.

In yet another embodiment, the compounding mixture in the step (A) comprises:
- (a) polyamide having the viscosity number in between 90 ml/g to 350 ml/g determined according to ISO 307,
- (b) copolymer having the weight average molecular weight in between 5000 g/mol to 15000 g/mol, said copolymer obtained by reacting the mixture comprising (b1) maleic acid and/or maleic anhydride, and (b2) vinyl monomer,
- (c) reinforcing agent,
- (d) impact modifier, and
- (e) nucleating agent.

Impact modifiers, often also termed rubber or elastomeric polymer, for use in the present invention are, for instance, described in US pub. nos. 2014/0323631 A1 and 2008/0070023 A1, all incorporated herein by reference. Suitable impact modifiers are selected from (i) ethylene polymers and copolymers grafted with carboxylic acid, an anhydride thereof, maleimide or an epoxy compound; and (ii) olefin or acrylic acid or anhydride terpolymers and ionomers.

In the ethylene polymers and copolymers grafted with carboxylic acid, anhydride thereof, maleimide or epoxy compound, the carboxylic acid or anhydride thereof is selected from maleic acid, fumaric acid, itaconic acid, acrylic acid, crotonic acid, a $C_1$ to $C_4$ alkyl half ester of maleic acid and their anhydrides or derivatives, including maleic anhydride. Also, olefinic rubbers can also be used as suitable impact modifiers.

In one embodiment, the impact modifiers are ethylene copolymers grafted with a carboxylic acid or any anhydride thereof, such as an ethylene copolymer grafter with maleic anhydride. In other embodiment, the impact modifiers include maleic anhydride grafted ethylene propylene diene terpolymer (EPDM) (maleic anhydride in between 2 wt.-% to 6 wt.-%); ethylene propylene grafted with maleic anhydride (maleic anhydride in between 0.5 wt.-% to 6 wt.-%); maleic anhydride grafted low density polyethylene (maleic anhydride in between 0.2 wt.-% to 6 wt.-%); and ethylene butyl acrylate grafted with maleic anhydride (maleic anhydride in between 0.2 wt.-% to 6 wt.-%).

The olefin or acrylic acid or anhydride terpolymer and ionomer impact modifiers have polymerized in-chain units derived from the monomers comprising: (a) ethylene, butylene, propylene and combinations thereof; (b) in between 2 wt.-% to 25 wt.-% of an acid selected from acrylic acid, methacrylic acid, and mixtures thereof; and (c) 0.1 wt.-% to 15 wt.-% of a dicarboxylic acid monomer selected from maleic acid, fumaric acid, itaconic acid, maleic anhydride, itaconic anhydride, a $C_1$ to $C_4$ alkyl half ester of maleic acid, and a mixture of these dicarboxylic acid monomers. In one embodiment, the terpolymer is an ethylene/methacrylic acid/maleic anhydride ionomer (in between 0.5 wt.-% to 12 wt.-% maleic anhydride). The ionomer can be formed by neutralization of carboxylic acid units in the terpolymer with metal ions selected from zinc, magnesium, manganese and mixtures thereof, alone or in combination with sodium or lithium ions. The terpolymer may further include up to 40 wt.-% of $C_1$ to $C_8$ alkyl acrylate monomer units.

The impact modifier, as described herein, can be present in an amount in between 10 wt.-% to 50 wt.-% based on the total weight of the compounding mixture.

Nucleating agents are well known to the person skilled in the art, however, in one embodiment, suitable nucleating agents are selected from sodium phenylphosphinate, aluminum oxide, silicon dioxide, talc powder and mixture thereof. In other embodiment, the nucleating agent is talc powder.

In one embodiment, the nucleating agents can be present in an amount in between 0.1 wt.-% to 10.0 wt.-% based on the total weight of the compounding mixture. In another embodiment, the amount is in between 0.1 wt.-% to 9.0 wt.-%, or 0.1 wt.-% to 8.0 wt.-%. In still other embodiment, it is in between 0.5 wt.-% to 8.0 wt.-%, or 0.5 wt.-% to 7.0 wt.-%. In yet other embodiment, it is in between 0.75 wt.-% to 7.0 wt.-%, or 0.75 wt.-% to 6.5 wt.-%.

In another embodiment, the compounding mixture in the step (A) further comprises additives. Suitable additives are selected from stabilizers, dyes, pigments, flame retardants, lubricants, UV absorbers, antistats, fungistats, bacteriostats, IR absorbing materials and antioxidants. These additives are well known and notably are mentioned in, for instance, Plastics Additives Handbook, Hanser, 4$^{th}$ edition. Moreover, these additives can be used in suitable amounts for the present invention. In one embodiment, the additives are present in between 0.1 wt.-% to 20 wt.-% based on the total weight of the compounding mixture.

Accordingly, in one embodiment, the compounding mixture in the step (A) comprises:
- (a) Polyamide having the viscosity number in between 90 ml/g to 350 ml/g determined according to ISO 307,
- (b) copolymer having the weight average molecular weight in between 5000 g/mol to 15000 g/mol, said copolymer obtained by reacting the mixture comprising (b1) maleic acid and/or maleic anhydride, and (b2) vinyl monomer,
(c) reinforcing agent,
(d) impact modifier,
(e) nucleating agent, and
(f) additives.

The compounding mixture obtained in step (A) is extruded or molded in step (B) to obtain the intrinsically foamed polyamide, as described herein.

In one embodiment, the compounding mixture is extruded to obtain the intrinsically foamed polyamide. Accordingly, the method for producing the intrinsically foamed polyamide comprises the steps of:

(A) melt compounding the compounding mixture, as described herein, and (B) extruding the compounding mixture of step (A) to obtain the intrinsically foamed polyamide having the void fraction in between 1% to 60% determined from SEM and the foam density of less than 1500 kg/m$^3$ determined according to ISO 1183/A.

In the present context, extruding refers to extrusion techniques well known to the person skilled in the art. Upon extruding the compounding mixture, extrudates of the intrinsically foamed polyamide are obtained, which may be further cooled and comminuted. These extrudates can be of any suitable shape, size and dimension. Suitable temperature for extrusion typically range in between 220° C. to 320° C. In an embodiment, the temperature is in between 230° C. to 280° C., or 240° C. to 260° C.

In other embodiment, suitable extruders include, such as but not limited to, a single screw extruder or a twin-screw extruder. The extrudates obtained from these extruders may be in the shape of, for instance, a continuous strip or a granule.

In another embodiment, the compounding mixture is molded to obtain the intrinsically foamed polyamide. Accordingly, the method for producing the intrinsically foamed polyamide comprises the steps of:

(A) melt compounding the compounding mixture, as described herein, and (B) molding the compounding mixture of step (A) to obtain the intrinsically foamed polyamide having the void fraction in between 1% to 60% determined from SEM and the foam density of less than 1500 kg/m$^3$ determined according to ISO 1183/A.

In one embodiment, molding in the step (B) is selected from blow molding, compression molding and injection molding. Suitable temperature for molding typically range in between 220° C. to 320° C. In an embodiment, the temperature is in between 230° C. to 280° C., or 240° C. to 260° C.

Although, the present invention describes steps (A) and (B) herein, there may be additional method steps required to obtain the intrinsically foamed polyamide, depending on its application. The additional method steps are well known to the person skilled in the art and therefore, do not limit the present invention.

Further, the method as described herein, provides for acceptable melt strength which renders the compounding mixture processable to obtain the intrinsically foamed polyamide. The intrinsically foamed polyamide, as obtained in the step (B), is stable and shows no bubble collapse due to the increased melt strength. Furthermore, as seen in FIG. 1 no bubble formation takes place at the surface of the intrinsically foamed polyamide. In fact, voids and bubbles are observed in the core of the material and not on the surface.

Additionally, the high void fraction of the intrinsically foamed polyamide with acceptable mechanical properties render it useful for applications, such as but not limited to, automotive parts, insulation material, structural reinforcing components, furniture components, window thermal breaker strips, tubes, pipes, cable jackets, electronic and electrical parts.

In the present context, the high void fraction refers to the void fraction as high as 60% in the intrinsically foamed polyamide. In one embodiment, the void fraction is in between 1% to 60% determined from SEM. Further advantageous properties of the intrinsically foamed polyamide, as described herein, include such as but not limited to, foam density of less than 1500 kg/m$^3$ determined according to ISO 1183/A, an average cell size in between 5 μm to 250 μm determined from SEM and a tensile strength in between 30 MPa to 250 MPa determined according to ISO 527.

In one embodiment, the void fraction is in between 5% to 60%, or 5% to 50%. The foam density is in between 500 kg/m$^3$ to 1500 kg/m$^3$, average cell size is in between 10 μm to 150 μm and tensile strength is in between 50 MPa to 180 MPa.

Additionally, the increased void fraction in the intrinsically foamed polyamide results in a decrease in thermal conductivity as well as dielectric constant. This renders the intrinsically foamed polyamide advantageous for application in, such as but not limited to, thermal breakers.

Another aspect of the present invention relates to the above intrinsically foamed polyamide.

Yet another aspect of the present invention relates to the shaped article comprising the above intrinsically foamed polyamide. The shaped article is selected from automotive parts, insulation material, structural reinforcing components, furniture components, window thermal breaker strips, tubes, pipes, cable jackets, electronic and electrical parts.

The presently claimed invention is illustrated in more detail by the following embodiments and combinations of the embodiments which result from the corresponding dependency references and links:

1. A method for producing an intrinsically foamed polyamide, said method comprising the steps of:
    (A) melt compounding a compounding mixture comprising:
        (a) a polyamide,
        (b) a copolymer having a weight average molecular weight in between 5000 g/mol to 15000 g/mol, said copolymer is obtained by reacting a mixture comprising (b1) maleic acid and/or maleic anhydride, and (b2) a vinyl monomer, and
        (c) a reinforcing agent, and
    (B) extruding or molding the compounding mixture of step (A) to obtain the intrinsically foamed polyamide having a void fraction in between 1% to 60% determined from scanning electron microscopy and a foam density of less than 1500 kg/m$^3$ determined according to ISO 1183/A.

2. The method according to embodiment 1, wherein in step (A) the melt compounding is carried out at a temperature in between 220° C. to 320° C.

3. The method according to embodiment 1 or 2, wherein the polyamide has a viscosity number in between 90 ml/g to 350 ml/g determined according to ISO 307.

4. The method according to one or more of embodiments 1 to 3, wherein the polyamide comprises an aliphatic polyamide.

5. The method according to one or more of embodiments 1 to 4, wherein the polyamide is selected from polyamide 6, polyamide 66, or a blend or a copolymer thereof.

6. The method according to one or more of embodiments 1 to 5, wherein the polyamide comprises polyamide 6.

7. The method according to one or more of embodiments 1 to 6, wherein the amount of the polyamide is in between 10 wt.-% to 90 wt.-%, based on the total weight of the compounding mixture.

8. The method according to one or more of embodiments 1 to 7, wherein the copolymer has a weight average molecular weight in between 7000 g/mol to 11000 g/mol.

9. The method according to one or more of embodiments 1 to 8, wherein (b2) the vinyl monomer is styrene.

10. The method according to one or more of embodiments 1 to 9, wherein the copolymer is obtained by reacting (b1) and (b2) in a molar ratio in between 1:1 to 5:1.

11. The method according to embodiment 10, wherein the molar ratio is in between 2:1 to 4:1.

12. The method according to one or more of embodiments 1 to 11, wherein the amount of the copolymer is in between 0.1 wt.-% to 10.0 wt.-%, based on the total weight of the compounding mixture.

13. The method according to one or more of embodiments 1 to 12, wherein the reinforcing agent is selected from metal fiber, metalized synthetic fiber, glass fiber, carbon fiber, ceramic fiber, mineral fiber, basalt fiber, inorganic fiber, kenaf fiber, jute fiber, flax fiber, hemp fiber, cellulosic fiber, sisal fiber and coir fiber.

14. The method according to one or more of embodiments 1 to 13, wherein the reinforcing agent is glass fiber.

15. The method according to one or more of embodiments 1 to 14, wherein the reinforcing agent is subjected to a surface treatment agent.

16. The method according to embodiment 15, wherein the surface treatment agent is a coupling agent comprising one or more of a silane coupling agent, titanium coupling agent, aluminate coupling agent, urethane coupling agent and epoxy coupling agent.

17. The method according to one or more of embodiments 1 to 16, wherein the amount of the reinforcing agent is in between 20 wt.-% to 70 wt.-% based on the total weight of the compounding mixture.

18. The method according to one or more of embodiments 1 to 17, wherein the compounding mixture further comprises an impact modifier and/or a nucleating agent.

19. The method according to embodiment 18, wherein the amount of the impact modifier is in between 10 wt.-% to 50 wt.-% based on the total weight of the compounding mixture.

20. The method according to embodiment 19, wherein the amount of the nucleating agent is in between 0.1 wt.-% to 10.0 wt.-% based on the total weight of the compounding mixture.

21. The method according to one or more of embodiments 1 to 20, wherein the compounding mixture further comprises additives.

22. The method according to embodiment 21, wherein the additives are selected from stabilizers, dyes, pigments, flame retardants, lubricants, UV absorbers, antistats, fungistats, bacteriostats, IR absorbing materials and antioxidants.

23. The method according to embodiment 22, wherein the amount of the additives is in between 0.1 wt.-% to 20 wt.-%, based on the total weight of the compounding mixture.

24. The method according to one or more of embodiments 1 to 23, wherein in step (B) a temperature in between 220° C. to 320° C. is maintained.

25. The method according to one or more of embodiments 1 to 24, wherein molding in step (B) is selected from blow molding, compression molding and injection molding.

26. The method according to one or more of embodiments 1 to 25, wherein the void fraction is in between 5% to 50% determined from scanning electron microscopy.

27. The method according to one or more of embodiments 1 to 26, wherein the foam density is in between 500 kg/m$^3$ to 1500 kg/m$^3$ determined according to ISO 1183/A.

28. The method according to one or more of embodiments 1 to 27, wherein the intrinsically foamed polyamide has a cell size in between 10 μm to 150 μm determined from scanning electron microscopy.

29. The method according to one or more of embodiments 1 to 28, wherein the intrinsically foamed polyamide exhibits a tensile strength in between 30 MPa to 250 MPa determined according to ISO 527.

30. An intrinsically foamed polyamide obtained from the process according to one or more of embodiments 1 to 29.

31. A shaped article comprising an intrinsically foamed polyamide according to embodiment 30 or as obtained from the process according to one or more of embodiments 1 to 29.

32. The shaped article according to embodiment 31, wherein the shaped article is selected from automotive parts, insulation material, structural reinforcing components, furniture components, window thermal breaker strips, tubes, pipes, cable jackets, electronic and electrical parts.

33. A method for producing an intrinsically foamed polyamide, said method comprising the steps of:
  (A) melt compounding a compounding mixture comprising:
    (a) a polyamide having a viscosity number in between 90 ml/g to 350 ml/g determined according to ISO 307,
    (b) a copolymer having a weight average molecular weight in between 5000 g/mol to 15000 g/mol, said copolymer is obtained by reacting a mixture comprising (b1) maleic acid and/or maleic anhydride, and (b2) a vinyl monomer, and
    (c) a reinforcing agent, and
  (B) extruding or molding the compounding mixture of step (A) to obtain the intrinsically foamed polyamide having a void fraction in between 1% to 60% determined from scanning electron microscopy and a foam density of less than 1500 kg/m$^3$ determined according to ISO 1183/A.

34. The method according to embodiment 33, wherein in step (A) the melt compounding is carried out at a temperature in between 220° C. to 320° C.

35. The method according to embodiment 33 or 34, wherein the polyamide comprises nylon-6.

36. The method according to one or more of embodiments 33 to 35, wherein (b2) the vinyl monomer is styrene.

37. The method according to one or more of embodiments 33 to 36, wherein the copolymer is obtained by reacting (b1) and (b2) in a molar ratio in between 1:1 to 5:1.

38. The method according to one or more of embodiments 33 to 37, wherein the amount of the copolymer is in between 0.1 wt.-% to 10.0 wt.-%, based on the total weight of the compounding mixture.

39. The method according to one or more of embodiments 33 to 38, wherein the reinforcing agent is selected from metal fiber, metalized synthetic fiber, glass fiber, carbon fiber, ceramic fiber, mineral fiber, basalt fiber, inorganic fiber, kenaf fiber, jute fiber, flax fiber, hemp fiber, cellulosic fiber, sisal fiber and coir fiber.

40. The method according to one or more of embodiments 33 to 39, wherein the reinforcing agent is glass fiber.

41. The method according to one or more of embodiments 33 to 40, wherein the compounding mixture further comprises an impact modifier and/or a nucleating agent.

42. The method according to one or more of embodiments 33 to 41, wherein the compounding mixture further comprises additives.

43. The method according to embodiment 42, wherein the additives are selected from stabilizers, dyes, pigments, flame retardants, lubricants, UV absorbers, antistats, fungistats, bacteriostats, IR absorbing materials and antioxidants.

44. The method according to one or more of embodiments 33 to 43, wherein in step (B) a temperature in between 220° C. to 320° C. is maintained.

45. The method according to one or more of embodiments 33 to 44, wherein molding in step (B) is selected from blow molding, compression molding and injection molding.

46. An intrinsically foamed polyamide obtained from the process according to one or more of embodiments 33 to 45.

47. A shaped article comprising an intrinsically foamed polyamide according to embodiment 16 or as obtained from the process according to one or more of embodiments 33 to 46.

48. The shaped article according to embodiment 47, wherein the shaped article is selected from automotive parts, insulation material, structural reinforcing components, furniture components, window thermal breaker strips, tubes, pipes, cable jackets, electronic and electrical parts.

EXAMPLES

The presently claimed invention is illustrated by the non-restrictive examples which are as follows:
Compounds

| | |
|---|---|
| Polyamide (PA) | PA 6 having the viscosity number in between 142 ml/g to 158 ml/g as determined according to ISO 307, obtained from BASF |
| Copolymer (CP) | Copolymer of styrene maleic anhydride (SMA) having Mw of 9500 g/mol and molar ratio of 3:1 (styrene:maleic anhydride), obtained from TOTAL Cray Valley |
| Reinforcing agent (RA) | Glass chopped strands having a strand length of 3.0 ± 1.0 mm, obtained from Nippon Electric Glass |
| Impact modifier (IM) | IM1: ethylene-methacrylic acid copolymer, obtained from DuPont<br>IM2: anhydride modified ethylene copolymer, obtained from DuPont |
| Nucleating agent (NA) | Talc powder having a median particle size of 1.1 μm, obtained from Mineral Technologies |
| Lubricant (LU) | Sodium stearate, obtained from Sigma Aldrich |

Standard Methods

| | |
|---|---|
| Foam density | ISO 1183/A |
| Tensile strength | ISO 527 |

The weight average molecular weight of the copolymer was determined using GPC, while the void fraction and average cell size was determined using density measurement and SEM techniques. For analyzing the sample using SEM, flow direction of electron beam was kept adjacent to the surface.

Compounding Mixture

The details about the compounding mixture in accordance with the present invention is summarized in Table 1. All amounts are in wt.-%.

TABLE 1

Compounding mixture according to the invention

| Ingredients | Ex. 1 | Ex. 2 | Ex. 3 | Ex. 4 | Ex. 5 | Ex. 6 | Ex. 7 |
|---|---|---|---|---|---|---|---|
| PA | 64 | 62 | 60 | 57 | 63.5 | 63 | 62.5 |
| CP | 1.0 | 2.0 | 2.0 | 2.0 | 1.5 | 2.0 | 2.5 |
| RA | 35 | 35 | 35 | 35 | 35 | 35 | 35 |
| NA | 0 | 1.0 | 3.0 | 6.0 | 0 | 0 | 0 |
| Properties of intrinsically foamed polyamide | | | | | | | |
| Density (kg/m$^3$) | 1154 | 1025 | 1023 | 1000 | 1124 | 1041 | 911 |
| Void fraction (%) | 18 | 27 | 27 | 29 | 20 | 26 | 35 |

General Synthesis of Intrinsically Foamed Polyamide

The compounding mixtures of Table 1 were extruded into a continuous strip using a Davis Standard single screw extruder. Extrusion temperature was between 240° C. to 280° C., and screw speed was between 20-30 rpm. A slit die was used (30.5 mm×4 mm) and material started to foam as soon as it came out of the die. The foamed strip shape extrudate then entered into a cooling bath for cooling and solidification. Pulled, dried and collected at the end. Dumbbell shaped specimen were fabricated from the extruded strips using cutting tools to measure tensile properties.

From Table 1, it is evident that addition of SMA from 1.0 wt.-% to 2.5 wt.-% decreases the density of a 35 wt.-% glass filled PA 6 composite from 1150 kg/m$^3$ (18% void fraction) to 910 kg/m$^3$ (35% void fraction). It is also evident that SMA generates gas during the extrusion process and acts as a blowing agent. Simultaneously, as a chain extender SMA also increases the melt strength, so foam bubbles can grow in the polymer melt without collapsing.

Effect of Reinforcing Agent and Copolymer Content

The effect of reinforcing agent and copolymer content on the intrinsically foamed polyamide is summarized in Table 2. All amounts are in wt.-%.

TABLE 2

Effect of reinforcing agent and copolymer content

| Ingredients | Ex. 8 | Ex. 9 | Ex. 10 | Ex. 11 | Ex. 12 | Ex. 13 |
|---|---|---|---|---|---|---|
| PA | 58.70 | 56.70 | 47.70 | 46.70 | 38.70 | 37.70 |
| RA | 40.00 | 40.00 | 50.00 | 50.00 | 60.00 | 60.00 |
| CP | 1.00 | 3.00 | 1.00 | 3.00 | 1.00 | 2.00 |
| LU | 0.30 | 0.30 | 0.30 | 0.30 | 0.30 | 0.30 |
| Properties of intrinsically foamed polyamide | | | | | | |
| Average cell size (μm) | 51.35 | 131.07 | 50.68 | 114.74 | 66.58 | 84.21 |
| Void fraction (%) | 12.3 | 40.3 | 10.7 | 37 | 17.2 | 21.5 |
| Elastic Modulus (MPa) | 10609 | 6130 | 12390 | 5945 | 13763 | 10044 |
| Density (kg/m$^3$) | 1280 | 870 | 1340 | 950 | 1400 | 1330 |

The compounding mixture of Table 2 was extruded into a continuous strip using a single screw extruder. Dumbbell shaped specimen were fabricated from the extruded strips using cutting tools to measure tensile properties. Density of each sample was also measured. Average cell size was measured and reported for all samples using SEM microscopy.

It is evident from Table 2 that increasing SMA content results in reduction in the density of the sample (or increase in the void fraction). Reinforcing agent content does not show much variation on void fraction at low concentration of SMA (i.e. 1.0 wt.-%).

Further, increasing SMA content decreases elastic modulus of the intrinsically foamed polyamide. An increase in the amount of the reinforcing agent results in higher elastic modulus values. Furthermore, at low SMA concentration (1.0 wt.-%), although density reduces by almost 10-12%, E-Mod is maintained, particularly for 40 wt.-% and 50 wt.-% glass filled samples (Table 2).

SEM images were taken from the area adjacent to the surface of the extrudate sample. It is evident from images that no bubble is formed at the surface. Voids and bubbles are all observed in the core of the material and not on the surface.

The invention claimed is:

1. A method for producing an intrinsically foamed polyamide, said method comprising the steps of:
   (A) melt compounding a compounding mixture comprising:
      (a) a polyamide having a viscosity number in between 90 ml/g to 350 ml/g determined according to ISO 307, wherein the amount of the polyamide is in between 10 wt % to 80 wt %, based on the total weight of the compounding mixture,
      (b) a copolymer having a weight average molecular weight in between 5000 g/mol to 15000 g/mol, wherein said copolymer is obtained by reacting a mixture comprising (b1) maleic acid and/or maleic anhydride, and (b2) a vinyl monomer, wherein the molar ratio of (b1) to (b2) is in between 1:1 to 5:1 and wherein the amount of the copolymer is in between 0.1 wt % to 10 wt %, based on the total weight of the compounding mixture, and
      (c) a reinforcing agent, wherein the amount of the reinforcing agent is in between 20 wt % to 70 wt %, based on the total weight of the compounding mixture, and
   (B) extruding or molding the compounding mixture of step (A) to obtain the intrinsically foamed polyamide having a void fraction in between 1% to 60% determined from scanning electron microscopy and a foam density of less than 1500 kg/m3 determined according to ISO 1183/A,
   wherein the reinforcing agent is selected from metal fiber, metalized synthetic fiber, glass fiber, carbon fiber, ceramic fiber, mineral fiber, basalt fiber, inorganic fiber, kenaf fiber, jute fiber, flax fiber, hemp fiber, cellulosic fiber, sisal fiber and coir fiber.

2. The method according to claim 1, wherein in step (A) the melt compounding is carried out at a temperature in between 220° C. to 320° C.

3. The method according to claim 1, wherein the polyamide comprises nylon-6.

4. The method according to claim 1, wherein (b2) the vinyl monomer is styrene.

5. The method according to claim 1, wherein the reinforcing agent is glass fiber.

6. The method according to claim 1, wherein the compounding mixture further comprises an impact modifier and/or a nucleating agent.

7. The method according to claim 1, wherein the compounding mixture further comprises additives.

8. The method according to claim 7, wherein the additives are selected from the group consisting of stabilizers, dyes, pigments, flame retardants, lubricants, UV absorbers, antistats, fungistats, bacteriostats, IR absorbing materials and antioxidants.

9. The method according to claim 1, wherein in step (B) a temperature in between 220° C. to 320° C. is maintained.

10. The method according to claim 1, wherein the molding in step (B) is selected from the group consisting of blow molding, compression molding and injection molding.

* * * * *